Oct. 30, 1956 — A. C. HOECKER — 2,768,455

STEAM IRONS

Filed July 1, 1949

Inventor:
Albert C. Hoecker,
by Lawrence R. Kempton
His Attorney.

United States Patent Office 2,768,455
Patented Oct. 30, 1956

2,768,455

STEAM IRONS

Albert C. Hoecker, St. Louis, Mo., assignor, by mesne assignments, to General Electric Company, New York, N. Y., a corporation of New York Application July 1, 1949, Serial No. 102,503

2 Claims. (Cl. 38—77)

This invention relates to certain new and useful improvements in steam irons.

One of the objects of the invention is to provide a steam iron with means for producing selectively high pressure or low pressure steam.

A further object of this invention is to construct a steam iron for increased safety with improved means for automatically releasing an over pressure in the steam compartment.

Another object of the invention is to provide means for introducing water into a steam iron reservoir through the steam distributing conduit.

Briefly stated, in accordance with one aspect of this invention, a steam iron is constructed with a relatively large steam distributing conduit for conducting steam from the steam chamber to the ironing surface. An adjustable valve is provided for controlling steam pressure in the discharge outlet for the steam. This valve also functions as a pressure relief valve; and when manually opened, permits addition of water into the iron through the steam conduit.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing in which Fig. 1 is a sectional elevation through a steam iron embodying this invention;

Figure 1:
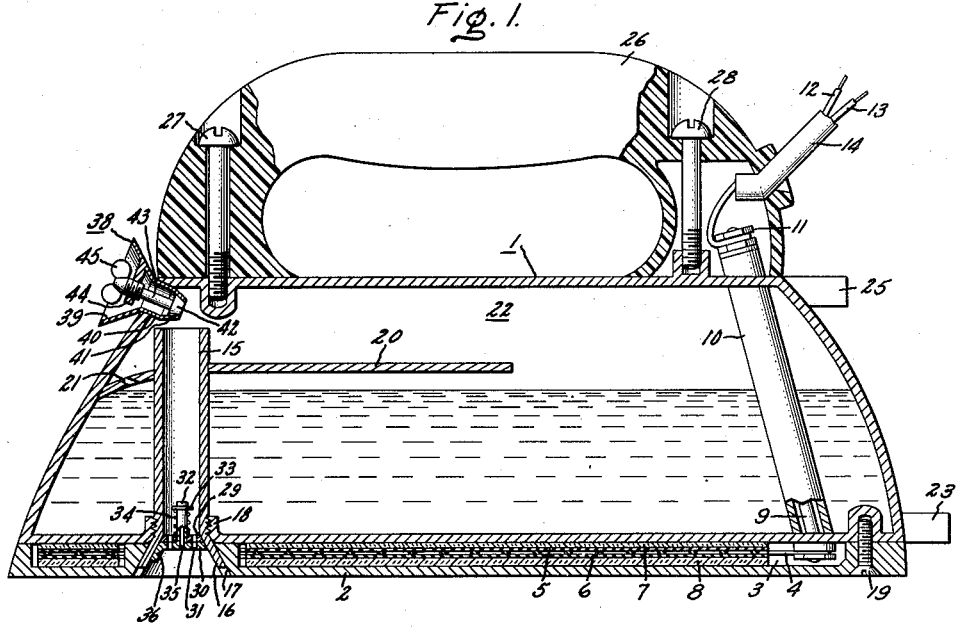

Referring to the accompanying drawing, a steam iron in accordance with this invention includes a boiler 1 and a soleplate or pressing surface 2. The soleplate is provided with a recess 3 for the reception of a heating element. In this instance, the heating element is illustrated as including resistance wire 4 appropriately supported on upper and lower electrical insulators 5 and 6. In order to prevent overheating of the pressing surface 2 and for directing most of the heat from the heating element to the boiler, a thin insulator 7 is placed between the boiler and the heating element, and a thick insulator 8 between the heating element and the pressing surface. Electrical connection is provided for the heating element by means of leads 9 extending upwardly through a tube 10. At the upper end of tube 10, a terminal structure 11 may be provided as a point of connection for electrical supply wires 12 and 13 embodied in the usual manner into a supply cord 14.

Figure 2:
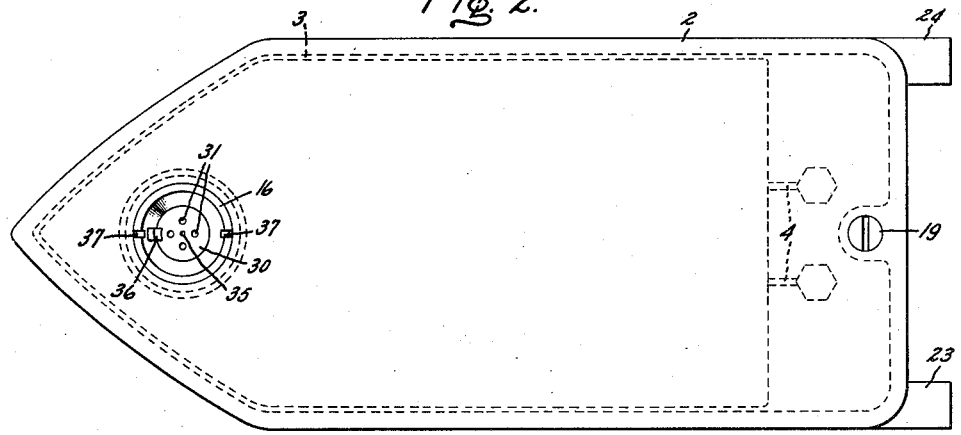
Fig. 2 is a bottom plan view of the iron shown by Fig. 1.

A relatively large steam distributing conduit 15 is provided adjacent the forward end of the iron. This steam pipe 15 includes a funnel portion 16 adapted to be positioned in an opening 17 in soleplate 2. The bottom wall of the boiler is provided with a threaded opening 18, while the steam distributing pipe is externally threaded. Thus, when assembled, with pipe 15 threaded into the bottom wall of the boiler, the pressing surface or soleplate is secured to the boiler. To facilitate insertion or removal of tube 15, the funnel or conical portion thereof may be provided with slots 37, as shown by Fig. 2. Preferably, an additional fastening means such as screw 19 is employed adjacent the rear end of the iron for securing the soleplate to the boiler.

In order to prevent water from splashing into the steam distributing pipe 15 while ironing, the boiler is provided with a baffle 20 which extends from one side wall of the boiler to the other side wall, and from the front wall rearwardly, as shown by Fig. 1. To facilitate emptying the boiler of water, the baffle may be provided with a small opening 21, so that when the toe of the iron is tilted downwardly, the water will pass through opening 21 into the steam chamber 22. A substantial proportion of the water may then pass out through the steam distributing tube 15. With the pipe 15 extending above baffle 20 as shown by Fig. 1, the boiler can be emptied sufficiently for practical purposes; however, the boiler could be completely emptied if pipe 15 were shortened to be flush with the upper surface of the baffle.

The iron may be provided with a heel rest by including projections such as 23, 24 and 25 at the rear of the iron.

A handle 26 for operating the iron may be secured to the boiler by any convenient means such as screws 27 and 28 as shown.

After the boiler is filled with water, electrical connection is established between conductors 12 and 13 and a source of electrical energy. This results in emanation of heat from the heating element to heat the pressing surface and the water in the boiler to convert the water into steam. The steam passes upwardly into steam chamber 22 and through steam distributing pipe 15 to the material to be ironed. The large diameter pipe 15 provides low pressure steam, and in view of the fact that the greater part of the heat from the heating element is directed to the boiler, a large amount of low pressure, wet steam is provided.

When the iron is on an even keel, for example, while pressing material, steam only passes through pipe 15. However, if the operator desires additional dampening with atomized water, the iron is lifted off the material, and the toe of the iron is tilted downwardly. A small amount of water then passes through the aperture 21 and is introduced into steam pipe 15.

To atomize the water in a satisfactory manner, the steam pressure must be greater than the normal steam pressure used, for example, in conventional steam irons. In accordance with this invention, means are provided for changing from low to high steam pressure. For this purpose, the discharge outlet of pipe 15 is provided with a safety device or valve which consists of two disks 29 and 30, as shown most clearly by Fig. 3. Each of said disks has a plurality of like perforations 31 which may be aligned, as shown. Disk 29, additionally, is provided with a central opening through which a stem 32 attached to and forming part of lower disk 30 extends. The upper portion of stem 32 has a collar 33 secured thereon as a bearing surface for a compression spring 34, the other end of this spring bearing against disk 29. This spring 34 acts to hold disks 29 and 30 into close contact with each other. When perforations 31 of both disks are in alignment, low pressure steam is supplied to the pressing surface. Additionally, the stem 32 is provided with a minute discharge passage 35. Disk 29 normally remains stationary, since it may be pressed or otherwise secured into pipe 15. Disk 30, however, with its stem 32 is rotatable with respect to disk 29. To facilitate such rotation, disk 30 may be provided with an extension 36, Assuming now that the valve is in the position shown by Fig. 3 with the perforations 31 in alignment, and that high pressure steam is desired, extension 36 on disk 30 is rotated either direction, thereby closing the openings 31, to cause the steam in the boiler to rise in pressure. The only outlet passage now is the minute passage 35. If the toe of the iron is tilted downwardly to admit water into steam distributing pipe 15, the high pressure steam is more effective to atomize this water to dampen the material being ironed.

With the perforations 31 closed and high pressure steam passing through the minute opening 35, there is a possibility that scale or other material may obstruct this passage. In this event, the steam pressure would rise above a safe value. In such eventuality, disks 29 and 30 separate to permit the steam pressure to exhaust through perforations 31, thus protecting the boiler and the operator.

Figure 3:
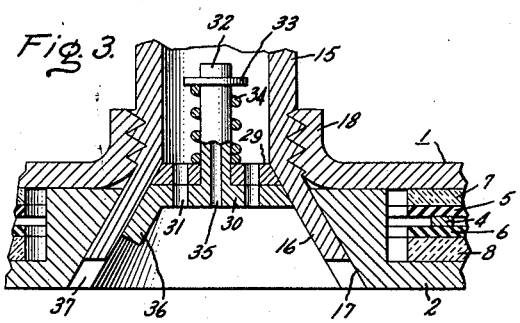
Fig. 3 is an enlarged cross-sectional view of a portion of Fig. 1 to illustrate details.

Boiler 1 may be filled with water by rotating extension 36 of disk 30 to align apertures 31, as shown in Fig. 3. The iron is then turned with the face of the pressing surface 2 upwardly, and in this position, water may be poured into the funnel or conical opening. The water flows through openings 31 and pipe 15 into the boiler.

If desired, additional water filling means for the boiler may be provided, such as in the form of a funnel 38 at the forward end of the boiler. Funnel 38 is shown as including a conical portion 39 and a cylindrical portion 40. The cylindrical part includes a tapered valve seat 41 for cooperation with a correspondingly tapered valve 42 connected to a valve stem 43. The valve stem has a threaded portion cooperatively engageable with a part 44 of the funnel. To facilitate rotation of the valve stem, its outer end is provided with a winged part 45. Funnel assembly 38 can be pressed into the boiler wall, welded, or otherwise secured. Water may be introduced into the boiler through funnel 38 by placing the iron on its heel rest and by opening valve 42 by rotating the winged part. Water may then be poured into the funnel and it will flow through valve 42 into the boiler. When the boiler is filled, valve 42 is again rotated to its seated position, sealing the boiler.

With an iron as thus constructed, the operator can select either high pressure or low pressure steam at will by adjusting the relative angular position of disk 30 with respect to disk 29. When apertures 31 in these disks are aligned, low pressure steam is provided; while slight rotation of disk 30 with respect to disk 29 results in closure of apertures 31, so that all of the steam must pass outwardly through the minute passageway 35. Therefore, high pressure is developed within the boiler and steam under relatively high pressure is supplied to the pressing surface through the minute passageway 35. If water is admitted into the steam tube while the iron is operating under such high pressure, this water is effectively atomized and discharged onto the fabric to be ironed. As described, a small quantity of water may be introduced into the steam tube 15 at any time, merely by tipping the forward end of the iron downwardly, whereupon a small quantity of water passes through aperture 21, and thus may be introduced into the steam tube. This iron possesses the additional advantage in that it may be easily filled. With the valve structure set for low pressure operation, water may be added to the boiler merely by pouring into the funnel-shaped opening in the soleplate or pressing surface of the iron. Additionally, the iron is protected at all times from over pressure by means of the construction of the steam valve whereby it functions also as an over pressure valve.

While the present invention has been described by reference to particular embodiments thereof, it is to be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. A steam iron comprising a steam boiler and a pressing surface, means communicating with the steam in said boiler including a discharge outlet for conducting the steam to the material to be ironed, a spring pressed rotatable valve in the discharge outlet of said means for converting said iron from a low pressure steam iron to high pressure steam iron, said valve having means formed thereon for manipulating the valve, and means for heating the water in said boiler to generate steam and for heating said pressing surface.

2. A steam iron including a steam boiler having a steam space and a water space and a pressing surface, means for heating said pressing surface and the water in said boiler to generate steam, a conduit communicating with said steam space and with an opening through said pressing surface for conducting the steam to the material to be ironed, and through which water can be admitted into said boiler for filling said boiler with water, said opening in said pressing surface being enlarged so as to form a funnel for admitting water from said funnel into said boiler, a safety valve and filling device mounted in the smaller opening of said funnel, a minute opening in said valve adapted to remain open through which high pressure steam is directed to the material to be ironed, said valve having a stationary part and a movable part both of said parts having openings adapted to move in and out of registration so that high and low pressure steam can be conducted to the material to be ironed, and so that water will enter said boiler when water is poured into said funnel.

References Cited in the file of this patent
UNITED STATES PATENTS

| | | |
|---|---|---|
| 310,051 | Harker et al. | Dec. 30, 1884 |
| 365,130 | Hills | June 21, 1887 |
| 2,218,325 | Ekstedt | Oct. 15, 1940 |
| 2,279,215 | Theilgaard | Apr. 7, 1942 |
| 2,368,048 | Stone | Jan. 23, 1945 |
| 2,547,558 | Bremer | Apr. 3, 1951 |